Figure 1:
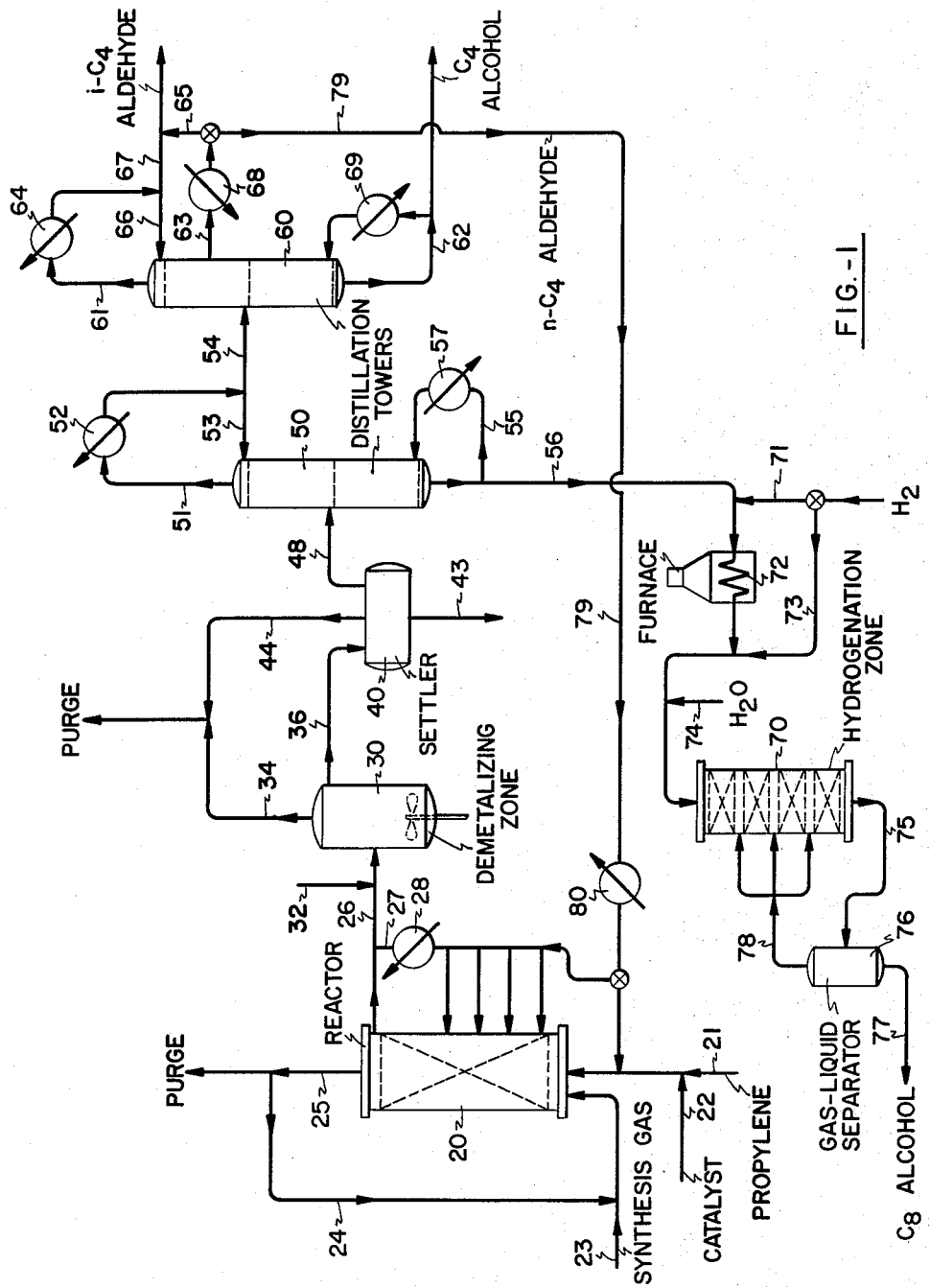

United States Patent Office 3,119,876
Patented Jan. 28, 1964

3,119,876
PRODUCTION OF ALDEHYDES AND ALCOHOLS
Stanley E. Jaros, Watchung, and Charles Roming, Jr., Towaco, N.J., assignors to Esso Research and Engineering Company, a corporation of Delaware
Filed Jan. 25, 1960, Ser. No. 4,320
10 Claims. (Cl. 260—604)

This invention relates to a modification of the oxo or carbonylation reaction, now known as the aldox process, wherein a high yield of dimer aldehydes or alcohols or both is obtained from an olefin monomer. More specifically, this invention relates to the aldox process wherein dimer aldehydes such as 2-ethylhexanal or the corresponding alcohols are produced from monomer olefins such as propylene. Still more particularly, this invention relates to an improvement of the aldox process whereby the desired dimer aldehyde product is maximized.

It is well known in the art that oxygenated organic compounds can be synthesized from organic compounds containing olefinic linkages by a reaction with carbon monoxide and hydrogen in the presence of a carbonylation catalyst, i.e. a catalyst containing a metal of group VIII in the periodic chart or a compound of such metals. These catalysts include compounds of cobalt, iron, rhodium, and the like. In the first stage of this oxo reaction, the olefinic material and catalyst together with proper proportions of carbon monoxide and hydrogen are reacted to give a product usually comprising predominantly aldehydes which in turn are converted by hydrogenation to alcohols containing one more carbon atom than the olefinic feed. When using an olefinic feed having $n$ carbon atoms per molecule, secondary products from the above described carbonylation reaction include dimeric aldehydes containing $2n+2$ carbon atoms. As an example, oxonation of propylene will produce the corresponding "monomeric" aldehydes, i.e. normal and iso butyraldehyde, as well as lesser amounts of the "dimeric" aldehydes, i.e. 2-ethylhexanal and 2-ethyl isohexanal. These aldehydes can then be hydrogenated to produce n-butanol, isobutanol 2-ethylhexanol, and 2-ethyl isohexanol, respectively. However, conventional oxo catalysts such as cobalt in its several useable forms yield only small quantities of dimeric products unless a condensation co-catalyst is also present. Such a co-catalyst system produces the so-called aldox modification of the oxo reaction. Similarly, ethylene can be converted by the aldox process to $C_6$ aldehydes and alcohols, butene-1 can be converted to $C_{10}$ aldehydes and alcohols, hexene-1 to $C_{14}$ aldehydes and alcohols, etc. Generally speaking, olefins having a terminal $CH_2=$ group adjacent to a double bond, i.e. Type I ($CH_2$:CHR) and Type III

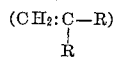

olefins, of 2 to 6 carbon atoms are preferred as feeds to the aldox process, propylene being particularly preferred.

Between the oxonation and hydrogenation stages of the conventional oxo process the oxonation stage product mixture is usually decobalted or demetalized. This may be accomplished by various known techniques such as thermal decobalting, acid decobalting, hot water decobalting, or by the use of hydrogen, all of which aid in decomposing the soluble cobalt carbonyls which are present. Suitable specific techniques for demetalizing oxo aldehydes may be found in the examples of U.S. Patents 2,679,534; 2,596,920; 2,757,205 and others.

The so-called aldox variation of the oxo process has been described previously in the Mason patent, U.S. 2,811,567, and elsewhere in the prior art. It provides a particularly desirable technique for converting propylene to $C_8$ aldehydes and, by hydrogenation of the latter, to $C_8$ alcohols, predominantly 2-ethylhexanol.

Although the aldox reaction is well known in the art, for a better understanding and for the purpose of making the present disclosure more self-contained, a brief description of the essential processing conditions will be indicated below. The carbonylation catalyst in the first or oxonation stage is preferably added in the form of an oil soluble salt of cobalt or other suitable catalytically active metal. Thus, suitable catalysts are, for example, cobalt oleate, naphthenate, stearate, and the like. These salts are soluble in the liquid olefin feed and may be supplied to the first stage, for instance, as a hydrocarbon solution dissolved in the olefin feed. Oil insoluble forms of the carbonylation catalyst may be alternatively employed in the form of pastes or aqueous solutions or suspension. These alternative types of catalyst include, for instance, cobalt acetate, cobalt formate, cobalt oxide, and the like. In addition, a condensation or polymerization-dehydration catalyst, preferably zinc in its several useable forms, is employed as a catalyst modifier or aldox co-catalyst. Many metals show some aldox catalytic activity; however, none is quite so effective as zinc. Those which approach zinc in aldox catalytic activity are primarily group II metals, particularly cadmium, magnesium, and beryllium. Lithium, vanadium, ferric iron, strontium, and gold co-catalysts also serve to increase aldox catalytic activity of the system, but to a lesser extent than the group II metals enumerated above. For good aldox activity it would appear that (1) tendency to form covalent complexes is required, and (2) a coordination number of 4 expandable to 6 is necessary. The aldox modifier is also preferably added in an oil soluble form such as the salt of a fatty acid such as oleic or naphthenic acids. Water soluble compounds, such as zinc chloride or acetate, may also be used but with much greater care in this instance since the zinc is much less liable to transfer into the oil or organic phase and hence promote the desired dimerization reaction. In this connection, the recycling of $C_4$ aldehydes and alcohols is particularly helpful since it tends to solubilize sufficient quantities of the water soluble catalysts in the organic phase so as to make them effective therein. The ratio of cobalt oxonation catalyst to aldox modifier is preferably maintained between 0.5 and 5 parts of oxonation catalyst (calculated as metal) to 1 part of modifier metal; cobalt metal concentrations of from 0.05 to 2 weight percent on fresh olefin feed are particularly suitable. If desired, an inert diluent, either liquid or gaseous, may be employed to aid in temperature control. The synthesis gas fed to the first stage, i.e. the oxo reactor, may contain hydrogen and carbon monoxide in a wide range of proportions, e.g. from 0.5 to 4 moles of hydrogen per mole of carbon monoxide. Preferably, synthesis gas is employed containing a hydrogen-carbon monoxide mole ratio of about 1/1 to 2/1. The pressures employed are generally in the range of 500 to 5,000 p.s.i.g. and the temperatures in the range of 150° to 450° F. It is well known, however, that the pressures and temperatures may exceed the ranges set forth herein and it will be understood that the specific ranges noted are merely examples of preferred conditions. The ratio of synthesis gas to olefin feed may also vary widely and in general may be maintained between 2,000 to 15,000 standard cubic feet of hydrogen and carbon monoxide per barrel of olefin feed.

The aldehydic product from an aldox reaction will comprise principally monomeric and dimeric aldehydes with lesser quantities of the corresponding alcohols. Thus, when propylene is used as feed the crude aldehydic product generally contains about equal volumes of saturated $C_4$ aldehydes and both saturated and unsaturated $C_8$ aldehydes. After demetalizing, these aldehydes are usually passed with hydrogen through a hydrogenation unit utilizing a conventional hydrogenation catalyst at ordinary hydrogenation conditions, e.g. at temperatures of 250°–550° F. and pressures from 500 to 3000 p.s.i.g. As a result, saturated $C_4$ and $C_8$ alcohols are obtained. It has been previously proposed that a $C_4$ aldehyde fraction be separated from the crude demetalized aldox product and recycled at least in part to the aldox synthesis zone wherein it can be further dimerized to the more valuable dimeric products. A substantial increase in the yield of $C_8$ aldehydes, and eventually 2-ethylhexanol, thereby results. However, at the same time, a substantial portion of this crude $C_4$ aldehyde fraction must be continuously or periodically purged from the recycle stream in order to prevent a buildup of the nonreactive components in the recycle system.

It has now been discovered that the dimerizable butyraldehyde can be more completely utilized and a greater total yield of the desired $C_8$ alcohol, 2-ethylhexanol, obtained when only a selected portion of the $C_4$ aldehydic fraction is recycled to the aldox synthesis zone. More specifically, it has been found advantageous to fractionate the aldox stage product so as to recover for recycling to the aldox synthesis a pure or concentrated normal butyraldehyde fraction substantially free of isobutyraldehyde and $C_4$ alcohols, i.e. a fraction containing 80 to 100% n-butyraldehyde and correspondingly 20 to 0% of other oxygenated $C_4$ compounds, preferably a fraction containing more than 90% of n-butyraldehyde and about 5% or less each of i-butyraldehyde and $C_4$ alcohols. In this manner it has been found possible to purge selectively from the recycle system the isobutyraldehyde and $C_4$ alcohols which do not lend themselves to further dimerization. The production of 2-ethylhexanol is thereby maximized through maximum utilization of the n-butyraldehyde precursor and, at the same time, the quantity of recycle required is greatly reduced. Contrary to expectations, it has been found that little self-condensation of the isobutyraldehyde or cross-condensation thereof with the normal butyraldehyde occurs, even though appreciable quantities of the iso structure are present. Moreover, the recycle of pure n-butyraldehyde surprisingly gives a substantially greater $C_8$ yield advantage than when the same amount of n-butyraldehyde is recycled in mixture with isobutyraldehyde; and still less of a $C_8$ yield increase is obtained if the butyraldehyde recycle additionally contains the $C_4$ alcohols produced in the synthesis zone. Hence, unless the isobutyraldehyde and $C_4$ alcohols are purged selectively in accordance with the present invention, relatively large amounts of recycle must be employed, and further, substantial amounts of the potentially dimerizable normal butyraldehyde must necessarily be purged from the aldox recycle concomitantly with the undesirable constituents. Also, recycling of large amounts of $C_4$ fraction from which the catalyst has been removed will decrease reactor propylene conversion unless additional catalyst is added; on the other hand, recycling only the pure n-butyraldehyde produced in the process does not significantly increase the catalyst requirements of the synthesis step.

In the attached drawing FIGURE 1 shows a simplified flow diagram of an aldox process modified in accordance with the present invention.

Figure 2:
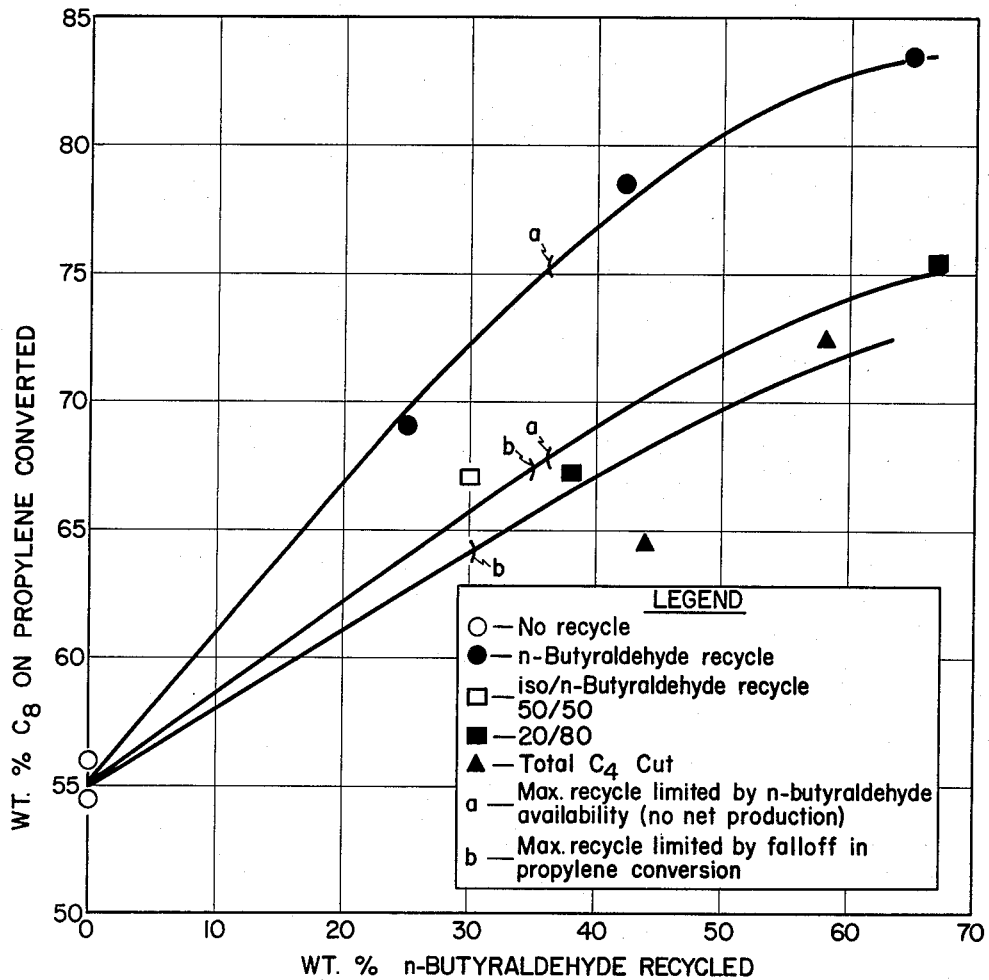

FIGURE 2 is a graph showing the effect of n-butyraldehyde recycle on the yield of desired $C_8$ product.

Referring to FIGURE 1 of the drawing, propylene feed is passed after preheating through feed line 21 to primary reactor 20. The latter comprises a reaction vessel which may, if desired, be packed with non-catalytic material such as Raschig rings, pumice, etc., and may be divided into discrete packed zones. Catalyst such as cobalt oleate is added via line 22 in the amounts indicated previously, e.g. 0.2 weight percent cobalt on olefin feed, with like amounts of an aldox modifier such as zinc oleate.

A gas mixture comprising an $H_2$:CO mole ratio preferably of about 1.5/1 is fed into the reactor via line 23 and flows concurrently with the feed. Typical reactor conditions include a temperature of about 300°–350° F. and a pressure of about 3000 p.s.i.g.

Unreacted gases, e.g. $H_2$, CO and inerts, are withdrawn via line 25 for purge or recycle via line 24, as desired. A liquid product mixture containing mainly monomeric and dimeric aldehydes and, in lesser amount, alcohols is withdrawn from reactor 20 via line 26 and passed to demetalizing zone 30. A portion of this liquid product stream may be recycled through line 27 and cooler 28 to reactor 20 to maintain the desired reaction temperature in said reactor. If desired, residual gases and a substantial portion of the unreacted olefin feed may be removed from the liquid phase product by passage through a gas-liquid separator (not shown), before entry into the demetalizing or clarifying vessel 30. In the illustrated embodiment under discussion, acetic acid demetalizing is employed. Other demetalizing techniques are well known in the art, e.g. thermal decobalting, using steam or water, but are less preferred due to the synergistic effects of aldox catalyst systems on metals removal. Demetalizing vessel 30 is of conventional design and is adapted thoroughly to mix aqueous and water insoluble liquid organic phases. Preferred temperature and pressure ranges for acid demetalizing are 150°–180° F. and 30–75 p.s.i.g., although temperatures and pressures over a wider range, i.e. 90–400° F. and 15–500 p.s.i.g., may be employed.

Sufficient aqueous acetic acid is admitted via line 32 in an otherwise well-known manner to convert the oil soluble metal catalyst compounds in stream 26 to water soluble forms. This is calculated as preferably 25 to 100% of the stoichiometric amount of acid necessary to convert all the catalytic metal present in stream 26, irrespective of its chemical form, to the corresponding acetate salts. About 1 to 3 hours reaction or holdup time on organic phase is provided in clarifier 30, with preferably about 10 to 25 volume percent water on stream 26.

The mixture from clarifier 30 is passed via line 36 to settling drum 40 wherein the organic and aqueous phases are allowed to settle into separate layers. Gas may be purged from clarifier 30 and settler 40 via lines 34 and 44. In settler 40, the water soluble metal compounds together with any solid metal-containing precipitate which may occur remain in the aqueous phase which is withdrawn via line 43 and which may, for instance, be treated separately for metals recovery. Holding time in this vessel should, of course, be sufficient to effect phase separation. A predominant amount of the aqueous layer will separate in a short time, whereas the remaining aqueous portion, which may amount to 3–10%, requires longer holding time, e.g., up to 2–12 hours. The demetalized aldehydic phase is removed via line 48 and may be passed through a conventional filtering means to a wash tower (not shown) to remove residual acidity and additional catalyst residues.

From clarifier 40 the crude aldehydic product containing both monomeric and dimeric compounds is passed via line 48 to an intermediate distillation zone 50, which serves to (1) fractionate the $C_4$ and lighter components from the $C_8$ and heavier components for separate hydrogenation of each fraction to produce alcohols and thereby provide for more efficient hydrogenation of each fraction and at the same time prevent contamination of the $C_4$ alcohols so produced with close boiling degradation product from the $C_8$ fraction, and (2) separate an n-butyraldehyde rich fraction for recycle to the aldox synthesis zone and conversion, thereby to make additional more valuable $C_8$ dimeric products. Several distillation alternates are available and the processing scheme hereinafter described represents one preferred embodiment but other schemes can be effectively employed to achieve the desired separations. The $C_4$ aldehydes and alcohols formed in the aldox synthesis together with the remaining unreacted olefin feed are taken overhead from atmospheric distillation tower 50 via line 51 at a temperature of 175° to 180° F., condensed in condenser 52 and in part refluxed to tower 50 via line 53. The remaining portion of this crude $C_4$ aldehydic stream is passed via line 54 to another atmospheric distillation tower 60, wherein crude isobutyraldhyde is recovered overhead via line 61 at a temperature of about 148° F., condensed in condenser 64 and in part refluxed to tower 60 via line 66 and in part sent onto further processing via line 67. A normal butyraldehyde rich stream, i.e., one containing 5–10 mole percent maximum, each, of isobutyraldehyde and $C_4$ alcohols, is withdrawn as side stream 63 at a temperature of about 170° F. and condensed in water condenser 68 for recycle to reactor 20 via line 79. In this manner the recycled n-butyraldehyde is given further opportunity to dimerize and to thereby produce the desired $C_8$ product. At the same time this recycle n-butyraldehyde may also be used as reactor coolant to maintain the desired reaction temperature in vessel 20. In such a case stream 79 is cooled to about 120° F. in water cooler 80 and to the corresponding extent reduces or replaces the amount of coolant liquid required to be recycled via line 27. Typically, towers 50 and 60 may have about 15 to 25 theoretical plates and be operated at atmospheric pressures with reflux ratios of about 3 to 5/1.

The normal butyl and isobutyl alcohols which are produced by hydrogenation of the corresponding aldehydes in the main synthesis reaction may be withdrawn from tower 60 as a crude bottoms cut 62 which may be further finished by hydrogenation and fractionation in an otherwise well-known manner, since any and all of the fractions produced in this intermediate distillation zone will normally have aldehyde components contained therein of sufficient magnitude to make them unsuitable as product alcohols for most uses. If desired, this crude $C_4$ alcohol fraction 62 may be combined with the crude isobutyraldehyde stream 67 prior to hydrogenation. Additional normal butanol may be produced by diverting a portion of the normal butyraldehyde rich stream from line 63 via line 65 to the hydrogenation reactor hereinafter described.

The bulk of the dimeric aldehyde fraction, which comprises mainly a mixture of 2-ethylhexenal, 2-ethylhexanal, 2-ethylhexenol and 2-ethylhexanol, together with lesser amounts of other isomeric $C_8$ and heavier aldehydes, alcohols, acetals, etc., is recovered from tower 50 as a bottoms stream 56, a part of this stream being returned to tower 50 via line 55 and reboiler 57. In general, it is preferable to operate tower 50 at as low a pressure as practicable so that bottoms stream 56 is not subjected to temperatures in excess of 400–450° F., although atmospheric pressure is sufficient.

The dimeric aldehyde product is passed through a furnace coil 72 to preheat the feed to hydrogenation conditions, e.g., 300–550° F. depending upon the hydrogenation catalyst, and the preheated dimeric aldehyde is then passed downflow through packed hydrogenation unit 70 where it is converted to the desired crude alcohol with an aldehyde content sufficiently low so as to be suitable for plasticizer alcohol use. Hydrogen may be introduced via lines 71 and 73 as desired prior to the coil or subsequently or both. Water may be added via line 74. It has been found convenient to use recycle hydrogen gas for reactor cooling purposes. Any conventional hydrogenation catalyst such as nickel, molybdenum sulfide or the like may be used, but a catalyst comprising molybdenum sulfide on a carbon support and a hydrogenation pressure of 3000 p.s.i.g. has been found especially desirable.

The hydrogenated product is taken via line 75 and to a gas-liquid separator 76 wherein hydrogen is separated from the liquid product for recycle to the hydrogenation reactor via line 78 if desired. The crude 2-ethylhexanol product is recovered via line 77 for final fractionation (not shown).

The isobutyraldehyde withdrawn from tower 60 via line 67 may be fed to a separate hydrogenation reactor (not shown, but similar to reactor 70) where it is converted in a known manner to crude isobutyl alcohol which may be redistilled as desired. The crude $C_4$ alcohols recovered in stream 62 as bottoms from tower 60 may, if desired, be combined with stream 67 prior to hydrogenation. Alternately, a single hydrogenation reactor may be used for the various aldehydic streams instead of using separate hydrogenation reactors for the $C_4$ and $C_8$ fractions. However, if only one hydrogenation reactor is provided, it is preferable to operate it in a blocked operation such that the hydrogenation catalyst acts only on either a $C_4$ or a $C_8$ aldehydic stream at any given time.

The process described above has the advantage of allowing maximum yields of the desired 2-ethylhexanol with minimum quantities of $C_4$ fraction recycle being required. This is further illustrated in the examples presented below. At the same time, the production of the less desired isobutyraldehyde and $C_4$ alcohols is minimized.

EXAMPLES

A series of aldox synthesis runs was carried out substantially as described earlier herein, with or without recycle of $C_4$ aldehyde to the synthesis zone. In this work a continuous flow unit was employed containing a reactor 39 inches long and having an inside diameter of 1.75 inches. The reactor was jacketed and packed with Raschig rings. It had a net volume of 1380 cc. and a free volume of 1020 cc. when packed.

The olefin feed was obtained from a commercial steam cracking process and contained 91% propylene, the balance being mainly propane plus a very small amount of propadiene and methylacetylene.

The following synthesis conditions were used in each run:

Pressure: 3000 p.s.i.g.; temperature: 300°–350° F.
Catalyst: 0.3 wt. percent cobalt and 0.2 wt. percent zinc (added in the form of oleates) on total fresh olefin feed.
Synthesis gas—rate: 4000 s.c.f./barrel of fresh feed. Composition: 1.25–1.45 moles $H_2$ per mole CO.
Olefin feed rate: 0.6 liquid volume fresh feed per free volume of reactor per hour.

All runs were operated substantially identically except that no recycle was employed in run No. 1; pure n-butyraldehyde was recycled in run No. 2; a mixture consisting of equal parts of n-butyraldehyde and i-butyraldehyde was recycled in run No. 3; and the total $C_4$ fraction from the process (butyraldehydes and butyl alcohols) was recycled in run No. 4. The results are summarized in Table I below.

Table I

EFFECT OF $C_4$ ALDEHYDE RECYCLE ON $C_8$ PRODUCT

| Run Number | 1 | 2 | 3 | 4 |
|---|---|---|---|---|
| Recycle: | | | | |
| Liquid | none | 100% n-butyraldehyde | 50/50 i/n-butyraldehyde | Total $C_4$ Fraction |
| Lbs./lb. of pure propylene feed | 0 | 0.23 | 0.56 | 1.15 |
| Net Yields,[1] lbs./lb. of pure propylene feed: | | | | |
| iso-butyraldehyde | 0.30 | 0.25 | 0.14 | 0.29 |
| n-butyraldehyde | 0.21 | | 0.11 | 0.09 |
| iso plus n-butanols | 0.13 | 0.14 | 0.14 | 0.06 |
| Total $C_8$ aldehyde and alcohol | 0.57 | 0.66 | 0.63 | 0.62 |
| Heavy Ends | 0.36 | 0.43 | 0.46 | 0.32 |
| Other | 0.03 | 0.05 | 0.04 | 0.03 |
| | 1.60 | 1.53 | 1.52 | 1.41 |
| Conversion of Contained Propylene, wt. percent | 95 | 95 | 93 | 85 |

[1] Adjusted to a 100% material balance basis after subtracting recycle.

The results show that $C_8$ production is maximized and recycle requirements minimized when n-butyraldehyde only is recycled (run No. 2). Although the total quantities of $C_4$ material were several times larger in runs No. 3 and 4 than in run No. 2, the amount of $C_8$ product was largest in the latter. The total propylene conversion also was largest in run No. 2 and very much less in run No. 4, indicating that recycling of total $C_4$ material has a decidedly adverse effect on propylene conversion. Moreover, analytical data not reproduced in Table I show that the ratio of 2-ethylhexanol structure to other iso $C_8$ structures was 85/15 in run No. 2 and 86/14 in run No. 3, despite the much greater concentration of isobutyraldehyde in the latter run than in the former; this indicates that isobutyraldehyde is largely unreactive. It should also be noted that pure n-butyraldehyde recycle (run No. 2) yields less $C_4$ material than any of the other runs. It has also been found that as the recycle rate of $C_4$ material is increased, increasing amounts of bottoms are formed as a function of the increased concentration of aldehydes present, and finally propylene conversion falls off due to the high space velocity of the reaction mixture. This pronounced effect of $C_4$ recycle rates on propylene conversion was quite unexpected since a similar effect becomes apparent only at very much higher recycle rates when total reaction zone effluent (FIG. 1, stream 27) is recycled. Perhaps this difference is due to the fact that the $C_4$ stream is demetalized whereas the total effluent still contains large amounts of reactive catalyst.

Another set of comparative runs is shown in Table II.

*Table II*

EQUILIBRIUM CONDITIONS FOR RECYCLE WITH 91% PROPYLENE FEED

| Run No. | 5 | 6 | 7 | 8 |
|---|---|---|---|---|
| Recycle Type | None | n-butyraldehyde only. | i/n-butyraldehyde 50/50. | Total $C_4$ Fraction. |
| Lbs. recycle/lb. pure propylene feed. | | 0.31 [1] | 0.70 [2] | 0.70.[2] |
| Yields—lb./lb. pure propylene feed: Total $C_8$ | 0.57 | 0.71 | 0.67 | 0.63. |

[1] No net n-butyraldehyde production.
[2] Approximate maximum rate for demetalized recycle without causing decrease in propylene conversion due to increasing v./v./hr. (about 1.0 maximum where charging 91% propylene at 0.6 v./v./hr.).

The data of Table II again show that recycling of concentrated n-butyraldehyde (run No. 6) is greatly superior to the other types of recycle schemes although in some of the other schemes, such as that of run No. 7, the total amount of n-butyraldehyde recycled to the reaction zone was greater than in run No. 6.

FIGURE 2 shows still other data illustrative of the present invention, based on further runs carried out under reaction conditions as described earlier herein. It is apparent that, as compared with no recycle of any $C_4$ material, recycle of a pure n-butyraldehyde stream gives an added $C_8$ yield advantage of about 20% (75% versus 55%) on propylene feed converted when operating at the maximum recycle rate practical in the system under consideration. By contrast, recycling the same amount of n-butyraldehyde in mixture with isobutyraldehyde is much less beneficial, adding only about 12% $C_8$ product on propylene converted at the maximum recycle rate. Recycle of the same amount of n-butyraldehyde in a total $C_4$ cut (aldehydes plus alcohols) is even less beneficial, and in this instance the maximum amount of recycle is limited by the fall-off in propylene conversion. Large amounts of recycle of $C_4$ fractions from which the catalyst has been removed will decrease reactor propylene conversion unless supplemental catalyst is added.

The foregoing general description and the illustrative examples will serve to teach the advantages of the invention. It will be understood, however, that many modifications and variations thereof are possible without departing from the scope of the invention as defined in the appended claims. For instance, while the invention has been described mainly with reference to recycling n-butyraldehyde in the conversion of propylene, similar advantages can be obtained in the conversion of other $C_2$–$C_6$ or higher Type I or Type III olefins to dimer aldehydes or alcohols when the corresponding straight chain monomer aldehyde is selectively recycled in the process.

What is claimed is:

1. In a process for making an aldehyde of $2n+2$ carbon atoms from an olefin having the formula $C_nH_{2n}$, $n$ in each instance being an integer in the range of from 2 to 6, by reacting said olefin with hydrogen and carbon monoxide in contact with a carbonylation catalyst, and an aldox condensation co-catalyst containing a metal selected from the group consisting of zinc, cadmium, magnesium and beryllium in a reaction zone to produce a crude aldehydic mixture containing a relatively less branched aldehyde of $n+1$ carbon atoms formed by carbonylation of said olefin at the alpha carbon atom, a relatively more branched aldehyde of $n+1$ carbon atoms as well as dimer aldehydes of $2n+2$ carbon atoms, the improvement which comprises withdrawing said crude aldehydic mixture from said reaction zone, demetalizing at least a portion of said crude aldehydic mixture, fractionally distilling the demetalized mixture to separate therefrom a fraction containing said relatively less branched aldehyde in concentrated form, and a fraction rich in dimer aldehydes, recycling said relatively less branched aldehyde fraction at least in part to said reaction zone, and recovering said dimer aldehyde fraction.

2. In a process for making a $C_8$ aldehyde by reacting propylene with hydrogen and carbon monoxide in contact with a carbonylation catalyst and a zinc-comprising aldox condensation co-catalyst in a reaction zone to produce a crude aldehydic mixture containing normal butyraldehyde, isobutyraldehyde and $C_8$ aldehydes, the improvement which comprises withdrawing said crude aldehydic mixture from said reaction zone, demetalizing at least a portion of said crude aldehydic mixture, fractionally distilling said demetalized aldehydic mixture to separate therefrom a normal butyraldehyde fraction substantially free of isobutyraldehyde and a fraction rich in $C_8$ aldehydes, recycling said normal butyraldehyde fraction at least in part to said reaction zone, and recovering said $C_8$ aldehyde fraction.

3. A process in accordance with claim 2 wherein said normal butyraldehyde fraction is substantially free of $C_4$ alcohols.

4. A process in accordance with claim 2 wherein said normal butyraldehyde fraction contains at least 90% of normal butyraldehyde and less than 10% of isobutyraldehyde and $C_4$ alcohols.

5. A process in accordance with claim 2 wherein the zinc-comprising aldox condensation co-catalyst is a zinc salt of a fatty acid.

6. A process in accordance with claim 2 wherein the zinc-comprising aldox condensation co-catalyst is zinc oleate.

7. In a process wherein 2-ethylhexanol is produced by reacting propylene in a reaction zone at a temperature between about 150° and 450° F. with carbon monoxide and hydrogen in the presence of a cobalt carbonylation catalyst modified with a zinc-containing dimerization co-catalyst to produce an aldehydic mixture containing $C_8$ and $C_4$ aldehydes, and hydrogenating $C_8$ aldehydes, the improvement which comprises demetalizing at least a portion of said aldehydic mixture, fractionally distilling said demetalized said aldehydic mixture in a distillation zone to yield an isobutyraldehyde fraction, and a normal butyraldehyde fraction, a $C_4$ alcohol fraction and a $C_8$ aldehyde fraction, and recycling said normal butyraldehyde fraction to said reaction zone.

8. A process according to claim 7 wherein said normal butyraldehyde fraction is cooled before recycling to said reaction zone.

9. A process according to claim 7 wherein said zinc-containing dimerization co-catalyst is a zinc salt of a fatty acid.

10. A process according to claim 7 wherein said zinc-containing dimerization co-catalyst is zinc oleate.

References Cited in the file of this patent

UNITED STATES PATENTS

| | | |
|---|---|---|
| 2,811,567 | Mason | Oct. 29, 1957 |
| 2,820,067 | Mertzweiller et al. | Jan. 14, 1958 |
| 2,845,465 | Cull et al. | July 29, 1958 |
| 2,862,979 | Cull et al. | Dec. 2, 1958 |
| 2,949,486 | Weesner et al. | Aug. 16, 1960 |